United States Patent
Shen

(10) Patent No.: US 10,372,189 B2
(45) Date of Patent: Aug. 6, 2019

(54) POWER-SAVING METHOD AND DEVICE

(71) Applicant: Wistron Corp., New Taipei (TW)

(72) Inventor: Zong-Ying Shen, New Taipei (TW)

(73) Assignee: WISTRON CORP., New Taipei (TW)

(*) Notice: Subject to any disclaimer, the term of this patent is extended or adjusted under 35 U.S.C. 154(b) by 143 days.

(21) Appl. No.: 15/437,404

(22) Filed: Feb. 20, 2017

(65) Prior Publication Data
US 2018/0157303 A1 Jun. 7, 2018

(30) Foreign Application Priority Data
Dec. 1, 2016 (TW) .............. 105139654 A

(51) Int. Cl.
*G06F 1/32* (2019.01)
*G06F 1/3209* (2019.01)
*G06F 1/3287* (2019.01)
*G06F 1/3218* (2019.01)

(52) U.S. Cl.
CPC .......... *G06F 1/3209* (2013.01); *G06F 1/3218* (2013.01); *G06F 1/3287* (2013.01); *Y02D 10/34* (2018.01)

(58) Field of Classification Search
None
See application file for complete search history.

(56) References Cited

U.S. PATENT DOCUMENTS

| | | | |
|---|---|---|---|
| 9,412,320 B2* | 8/2016 | Chen | G09G 3/3648 |
| 2006/0184780 A1* | 8/2006 | Yamada | G06F 9/4403 |
| | | | 713/1 |
| 2016/0301229 A1* | 10/2016 | Chao | H04N 21/42202 |

FOREIGN PATENT DOCUMENTS

| | | |
|---|---|---|
| TW | 502154 | 9/2002 |
| TW | 201215005 A1 | 4/2012 |
| TW | I392190 B1 | 4/2013 |

OTHER PUBLICATIONS

Taiwan Patent Office, Office Action, Patent Application Serial No. 105139654, dated Mar. 24, 2017, Taiwan.

* cited by examiner

*Primary Examiner* — Fahmida Rahman

(57) ABSTRACT

A power-saving method is provided. The method is used in a device and includes: measuring, by a light sensor of the device, luminous intensity of ambient light and generating a measurement value of ambient light; determining whether the measurement value of ambient light is greater than a threshold; and controlling the device to switch between a quick-start mode and a standby mode based on a determination result indicating whether the measurement value of ambient light is greater than the threshold.

4 Claims, 5 Drawing Sheets

POWER-SAVING METHOD AND DEVICE

CROSS REFERENCE TO RELATED APPLICATIONS

This application claims priority of Taiwan Patent Application No. 105139654, filed on Dec. 1, 2016, the disclosures of which are incorporated herein by reference in their entirety.

BACKGROUND OF THE INVENTION

Field of the Invention

The present invention relates to a power-saving method and device. More specifically, the present invention relates to a power-saving method and device capable of controlling electronic equipment to save power.

Description of the Related Art

Due to the increasing complexity of television (TV) sets, the startup time for a user to get his television to go from an off (standby) state to a desired channel and/or input (including boot time and time to navigate to the desired channel and input) has markedly increased in recent years.

Quick-start techniques can help solve this problem. When the user performs a quick start, an operating system remains booted up to reduce the startup time.

However, the quick start in applications still has the following disadvantages: (i) since the operating system remains on, power consumption is high; and (ii) the quick start needs to be triggered by the user. However, in general, the user does not have a need to perform a quick start during the vast majority of the day. Thus, there is a need for a power-saving method and device which can not only reduce unnecessary power consumption, but also perform the quick start function automatically without being triggered by the user.

BRIEF SUMMARY OF THE INVENTION

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

A power-saving method and device are provided.

In a preferred embodiment, a power-saving method is provided in the invention. The method is used in a device and includes: measuring, by a light sensor of the device, luminous intensity of ambient light and generating a measurement value of ambient light; determining whether the measurement value of ambient light is greater than a threshold; and controlling the device to switch between a quick-start mode and a standby mode based on a determination result indicating whether the measurement value of ambient light is greater than the threshold.

In some embodiments, the power-saving method further comprises: controlling the device to operate in the quick-start mode when determining that the measurement value of ambient light is greater than the threshold; and controlling the device to operate in the standby mode when determining that the measurement value of ambient light is less than or equal to the threshold. In some embodiments, after determining that the measurement value of ambient light is greater than the threshold, the method further comprises: detecting, by a motion sensor of the device, movement in a predefined area; generating, by the motion sensor, a motion-detection signal when detecting the movement; controlling the device to operate in the quick-start mode when receiving the motion-detection signal; and controlling the device to operate in the standby mode when not receiving the motion-detection signal. In some embodiments, when the device operates in the standby mode, the method further comprises: switching the device from the quick-start mode to the standby mode when the measurement value of ambient light is less than or equal to the threshold. In some embodiments, when the device operates in the quick-start mode and keeps receiving the motion-detection signal, the method further comprising: starting a timer; and switching the device from the quick-start mode to the standby mode when the timer has expired and the device is not turned on. In some embodiments, when the device operates in the standby mode and keeps receiving the motion-detection signal, the method further comprising: make another determination as to whether it receives the motion-detection signal to re-switch the device between the quick-start mode and the standby mode after the motion sensor does not detect the movement and stops generating the motion-detection signal.

In a preferred embodiment, a power-saving device is provided in the invention. The power-saving device comprises a light sensor and a control circuit. The light sensor measures luminous intensity of ambient light and generates a measurement value of ambient light. The control circuit comprises a processor and a memory, wherein the control circuit is coupled to the light sensor. The processor is configured to execute a program code stored in the memory to: receive the measurement value of ambient light; determine whether the measurement value of ambient light is greater than a threshold; and control the device to switch between a quick-start mode and a standby mode according to a determination result indicating whether the measurement value of ambient light is greater than the threshold.

In some embodiments, the processor is configured to execute the program code to: control the device to operate in the quick-start mode when determining that the measurement value of ambient light is greater than the threshold; and control the device to operate in the standby mode when determining that the measurement value of ambient light is less than or equal to the threshold. In some embodiments, the device further comprises a motion sensor. The motion sensor is coupled to the control circuit and generates a motion-detection signal when detecting movement in a predefined area. After determining that the measurement value of ambient light is greater than the threshold, the processor is configured to execute the program code to: control the device to operate in the quick-start mode when receiving the motion-detection signal; and control the device to operate in the standby mode when not receiving the motion-detection signal. In some embodiments, when the device operates in the standby mode, the processor is further configured to execute the program code to: switch the device from the quick-start mode to the standby mode when the measurement value of ambient light is less than or equal to the threshold. In some embodiments, when the device operates in the quick-start mode and keeps receiving the motion-detection signal, the processor is further configured to execute the program code to: start a timer; and switch the device from the quick-start mode to the standby mode when the timer has expired and the device is not turned on. In some embodiments, when the device operates in the standby mode and keeps receiving the motion-detection signal, the processor is further configured to execute the program code to: make another determination as to whether the processor receives the motion-detection signal to re-switch the device between the quick-start mode and the standby mode after the motion sensor does not detect the movement and stops generating the motion-detection signal.

BRIEF DESCRIPTION OF DRAWINGS

The accompanying drawings are included to provide a further understanding of the invention, and are incorporated in and constitute a part of the present invention. The drawings illustrate implementations of the invention and, together with the description, serve to explain the principles of the invention. It should be appreciated that the drawings are not necessarily to scale as some components may be shown out of proportion to the size in actual implementation in order to clearly illustrate the concept of the present invention.

DETAILED DESCRIPTION OF THE INVENTION

Figure 1:
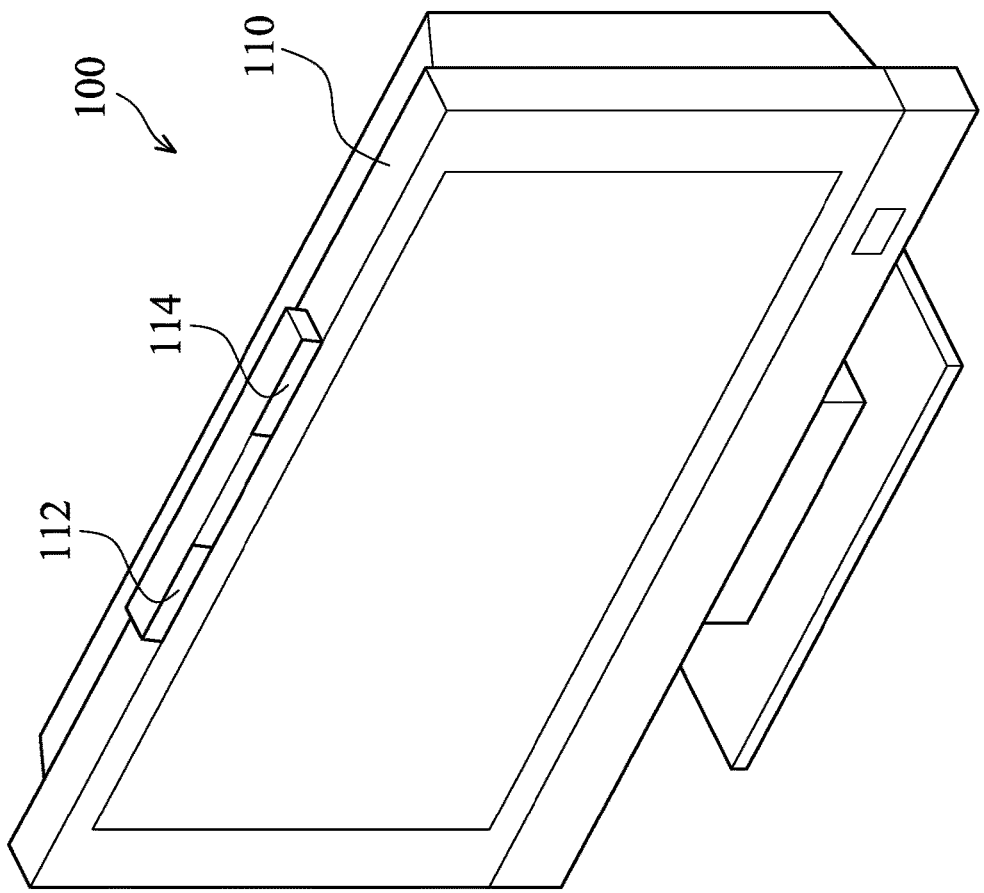
FIG. 1 is a schematic diagram illustrating a power-saving system in accordance with one embodiment of the invention.
Figure 1:
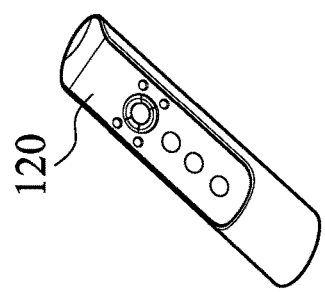

Several exemplary embodiments of the present disclosure are described with reference to FIGS. 1 through 4 which generally relate to a power-saving method and device. It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

FIG. 1 is a schematic diagram illustrating a power-saving system 100 in accordance with one embodiment of the invention. The power-saving system 100 comprises a power-saving device 110 and a controller 120. In the power-saving system 100, an operating system in the power-saving device 110 can be operated by using the controller 120.

The controller 120 is an input device which provides the power-saving device 110 with operation data indicating information pertinent to operations performed on the controller 120. The controller 120 and the power-saving device 110 are connected through wireless communications. In this embodiment, the technology of, for example, Bluetooth is employed for the wireless communication between the controller 120 and the power-saving device 110. Note that, in other embodiments, the controller 120 and the power-saving device 110 may be connected in a wired manner.

The power-saving device 110 can comprise a light sensor 112 and a motion sensor 114 to perform multiple functions (e.g., a device that measures the luminous intensity of ambient light, detects movement in a predefined area, plays video and music, and so on). The light sensor 112 and the motion sensor 114 can be integrated with the power-saving device 110, can be internal to the power-saving device 110, or can be mounted on the periphery of a screen of the power-saving device 110 (i.e., an upper side of the screen in FIG. 1). It should be noted that the power-saving device 110 may be general electronic equipment such as a television set or the like. Although the power-saving device 110 of FIG. 1 is shown in the form of a television, it should be well-understood by those skilled in the art that the present invention is not limited thereto.

Figure 2A:
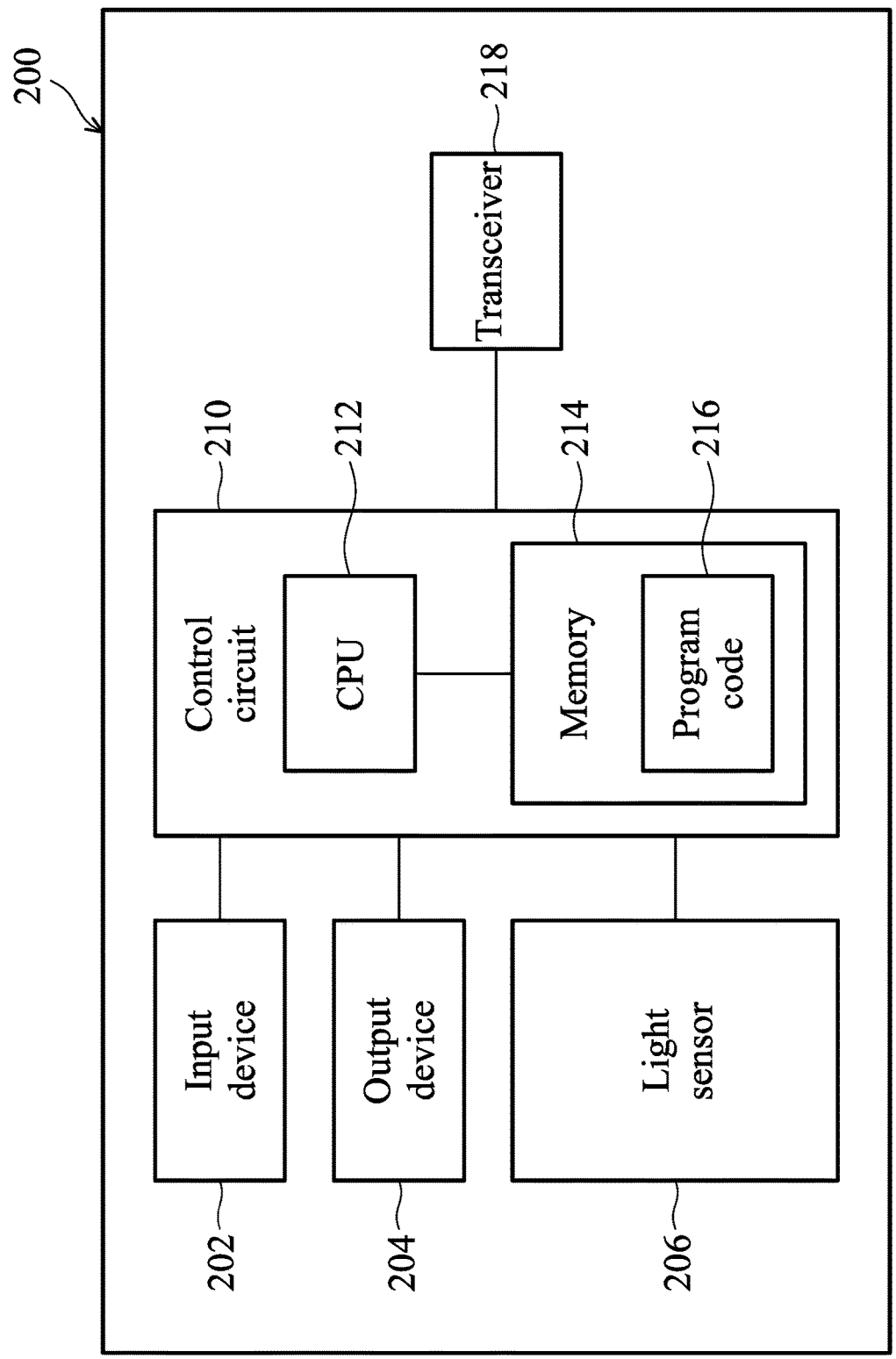
FIGS. 2A-2B are simplified functional block diagrams of a power-saving device according to one embodiment of the present invention.
Figure 2B:
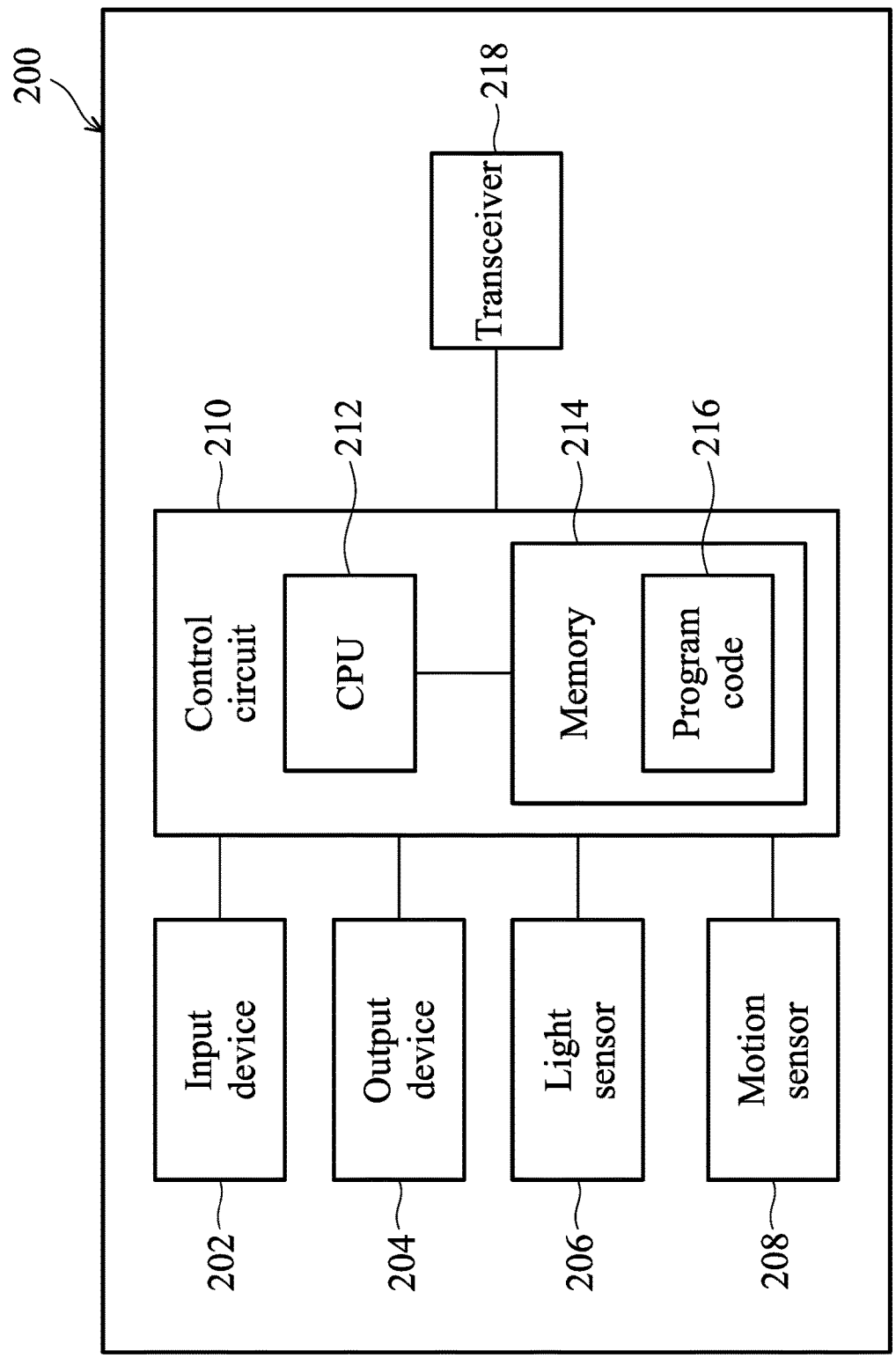

FIGS. 2A-2B are simplified functional block diagrams of a power-saving device 200 according to one embodiment of the present invention. As shown in FIGS. 2A-2B, the power-saving device 200 can be the power-saving device 110 of FIG. 1.

In FIG. 2A, the power-saving device 200 may include an input device 202, an output device 204, a light sensor 206, a control circuit 210 and a transceiver 218. The control circuit 210 can comprise a central processing unit (CPU) 212 and a memory 214. The memory 214 can store a program code 216. The control circuit 210 executes the program code 216 in the memory 214 through the CPU 212, thereby controlling the operation of the power-saving device 200. In addition, the CPU 212 can start a timer (not shown in FIG. 2), which could be a digital or a software clock and is used to control the sequence of an event or process.

The power-saving device 200 can receive signals input by a user through the input device 202, (such as a touch screen) and can output images and sound through the output device 204, such as a screen or speakers. The light sensor 206 can measure the luminous intensity of the ambient light of the power-saving device 200, and generate the measurement value of ambient light. The transceiver 218 is used to receive and transmit wireless signals wirelessly, deliver received signals to the control circuit 210, and output signals generated by the control circuit 210.

In FIG. 2B, the power-saving device 200 may include an input device 202, an output device 204, a light sensor 206, a motion sensor 208, a control circuit 210 and a transceiver 218. The control circuit 210 can comprise a central processing unit (CPU) 212 and a memory 214. The memory 214 can store a program code 216. Components having the same name as those described in FIG. 2 have the same function, so the details related to these components of the device will be omitted. The main difference between FIG. 2A and FIG. 2B is that the power-saving device 200 further includes a motion sensor 208.

The motion sensor 208 can be a device that detects movement in a predefined area. For example, the motion sensor 208 may employ an infra-red detector, an acoustical detector, or a combination of both for identifying any motion. The motion sensor 208 can generate a motion-detection signal and transmit the motion-detection signal to the control circuit 210 when detecting the movement in the predefined area.

Figure 3:
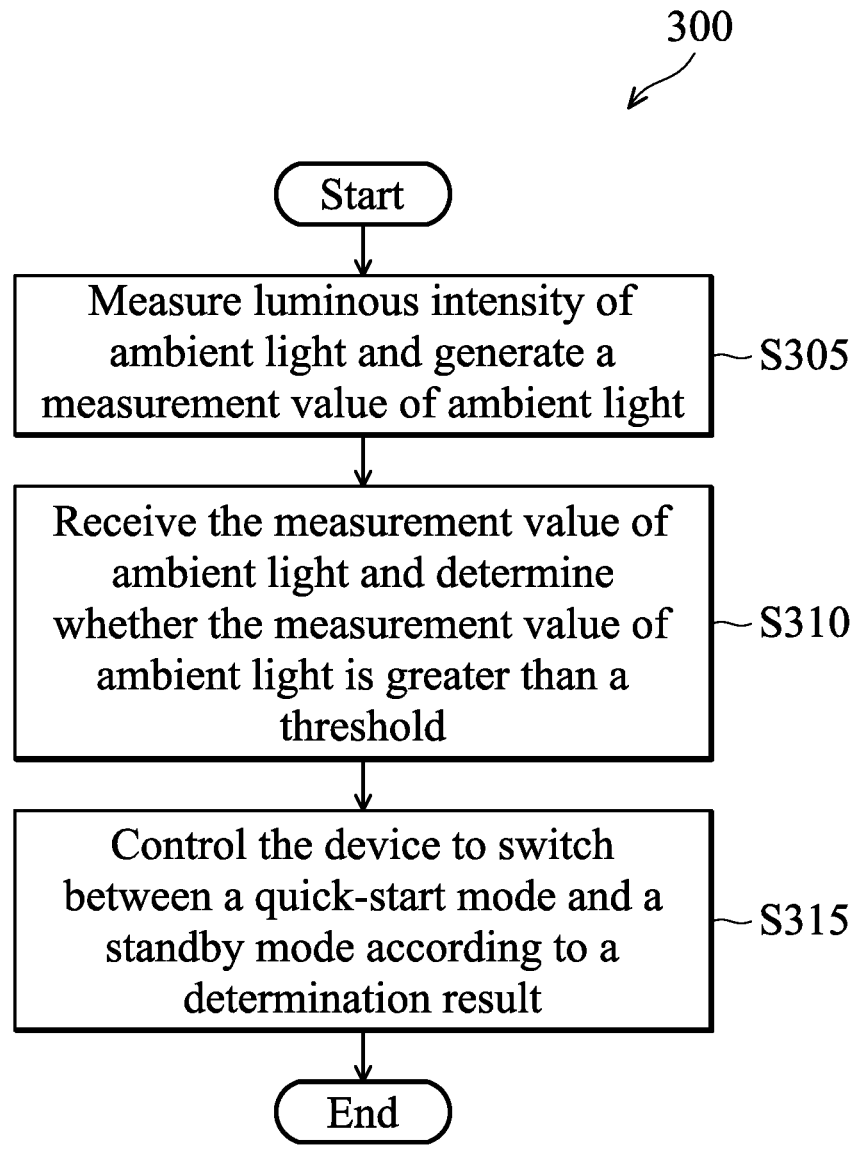
FIG. 3 is a flow diagram illustrating a power-saving method according to an embodiment of the present invention with reference to FIG. 2A.

FIG. 3 is a flow diagram 300 illustrating a power-saving method according to an embodiment of the present invention with reference to FIG. 2A. The method is used in the power-saving device of FIG. 2A. In step S305, the light sensor of the power-saving device measures luminous intensity of ambient light and generates a measurement value of ambient light. Next, in step S310, the processor of the power-saving device receives the measurement value of ambient light and determines whether the measurement value of ambient light is greater than a threshold. In step S315, the processor controls the device to switch between a quick-start mode and a standby mode according to a determination result indicating whether the measurement value of ambient light is greater than the threshold. More specifically, the processor controls the device to operate in the quick-start mode when determining that the measurement value of ambient light is greater than the threshold. The processor controls the device to operate in the standby mode when determining that the measurement value of ambient light is less than or equal to the threshold.

Figure 4:
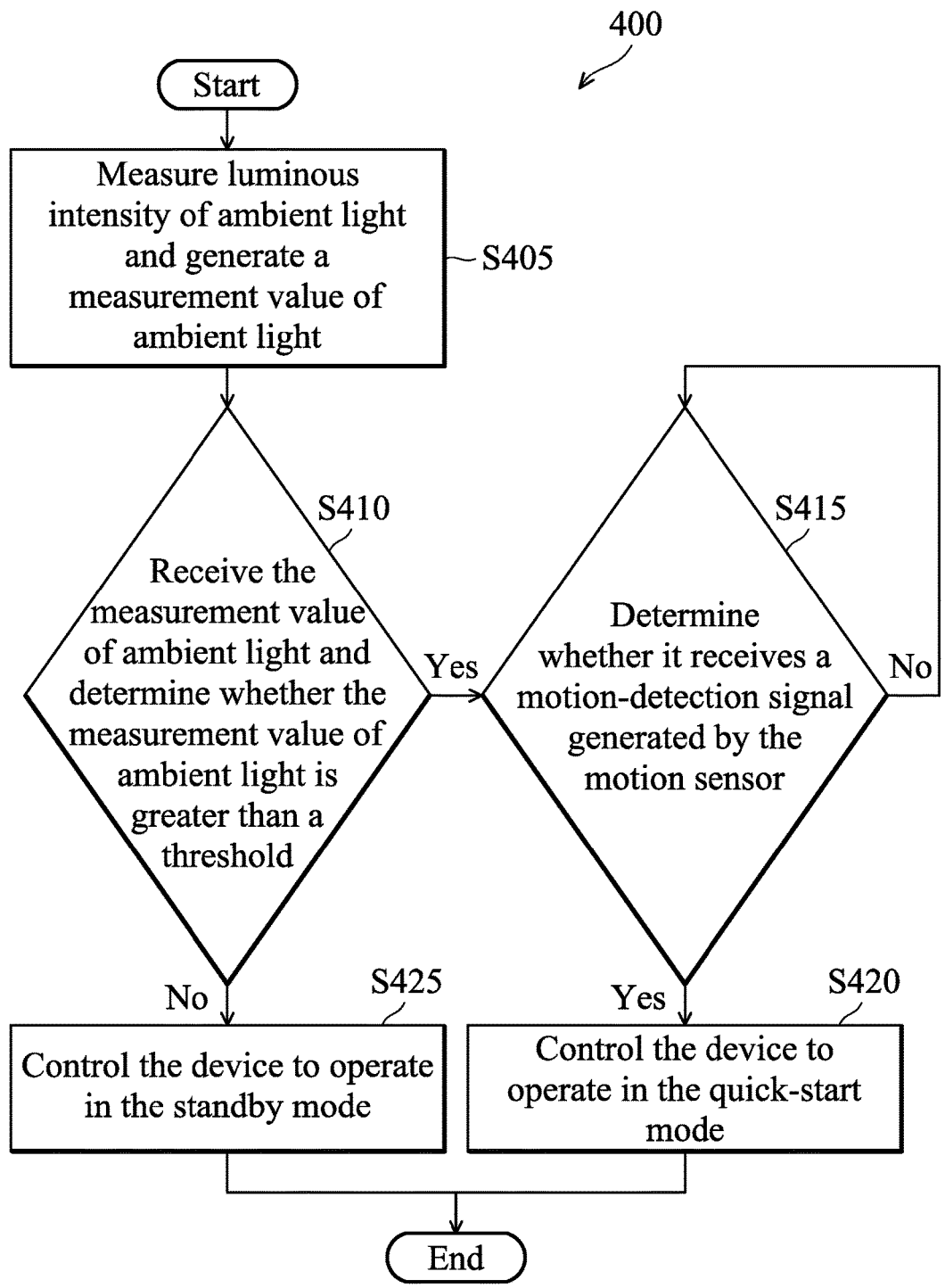
FIG. 4 is a flow diagram illustrating a power-saving method according to an embodiment of the present invention with reference to FIG. 2B.

FIG. 4 is a flow diagram 400 illustrating a power-saving method according to an embodiment of the present invention with reference to FIG. 2B. The method is used in the power-saving device of FIG. 2B.

In step S405, the light sensor of the power-saving device measures the luminous intensity of ambient light and generates a measurement value of ambient light. Next, in step S410, the processor of the power-saving device receives the measurement value of ambient light and determines whether the measurement value of ambient light is greater than a threshold. When the processor determines that the measurement value of ambient light is greater than the threshold ("Yes" in step S410), in step S415, the processor determines whether it receives a motion-detection signal generated by the motion sensor. When the processor receives the motion-detection signal ("Yes" in step S415), in step S420, the processor controls the device to operate in the quick-start mode. When the processor does not receive the motion-detection signal ("No" in step S415), the flow goes back to step 215 (that is, the processor keeps determining whether it receives the motion-detection signal). It should be noted that, in step S415, the processor can control the power-saving device to operate in the standby mode.

When the processor determines that the measurement value of ambient light is less than or equal to the threshold ("No" in step S410), in step S425, the processor controls the device to operate in the standby mode.

In an embodiment, when the power-saving device operates in the quick-start mode and the measurement value of ambient light is less than or equal to the threshold, the processor switches the device from the quick-start mode to the standby mode.

In another embodiment, when the power-saving device operates in the quick-start mode and the processor keeps receiving the motion-detection signal generated by the motion sensor, the processor can start a timer. When the timer has expired and the power-saving device is not turned on, the processor can switch the power-saving device from the quick-start mode to the standby mode. After the motion sensor does not detect the movement and stops generating the motion-detection signal, the processor can make another determination as to whether the processor receives the motion-detection signal to re-switch the power-saving device between the quick-start mode and the standby mode. The above steps can avoid situations where the power-saving device is in the quick-start mode when the user keeps performing an activity in the predetermined area but does not turn on the power-saving device.

In addition, in the above exemplary device, although the method has been described on the basis of the flow diagram using a series of steps or blocks, the present invention is not limited to the sequence of the steps, and some of the steps may be performed in a different order than that of the remaining steps or may be performed simultaneously with the remaining steps.

In addition, the CPU 212 could execute the program code 216 to perform all of the above-described actions and steps or others described herein.

Various aspects of the invention have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in ways that vary for each particular application, but such implementation decisions should not be interpreted as causing a departure from the scope of the present invention.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or another programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general-purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. It should be understood that the specific order or hierarchy of steps in the processes may be rearranged while remaining within the scope of the present invention. The accompanying method claims present elements of the various steps in a sample order, and are not meant to be limited to the specific order or hierarchy presented.

While the invention has been described by way of example and in terms of exemplary embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A power-saving method, used in a device, comprising:
    measuring, by a light sensor of the device, luminous intensity of ambient light and generating a measurement value of ambient light;
    determining whether the measurement value of ambient light is greater than a threshold;
    when determining that the measurement value of ambient light is less than or equal to the threshold, controlling the device to operate in a standby mode; and
    when determining that the measurement value of ambient light is greater than the threshold, performing the steps of:
        detecting, by a motion sensor of the device, movement in a predefined area;
        generating, by the motion sensor, a motion-detection signal when detecting the movement;
        controlling the device to operate in a quick-start mode when receiving the motion-detection signal, wherein when the device operates in the quick-start mode and keeps receiving the motion-detection signal, performing the steps of:
        starting a timer;
        switching the device from the quick-start mode to the standby mode when the timer has expired and the device is not turned on; and
        determining, after the device has switched to the standby mode, whether the device receives the motion detection signal, and switching the device back to the quick-start mode when it is determined that the motion detection signal is received; and
        controlling the device to operate in the standby mode when not receiving the motion-detection signal.

2. The power-saving method as claimed in claim 1, wherein when the device operates in the quick-start mode, the method further comprises:
    switching the device from the quick-start mode to the standby mode when the measurement value of ambient light is less than or equal to the threshold.

3. A power-saving device, comprising:
    a light sensor, measuring luminous intensity of ambient light and generating a measurement value of ambient light;
    a motion sensor, generating a motion-detection signal when detecting movement in a predefined area;
    a control circuit, comprising a processor and a memory, wherein the control circuit is coupled to the light sensor and the motion sensor;
    wherein the processor is configured to execute a program code stored in the memory to:
        receive the measurement value of ambient light;
        determine whether the measurement value of ambient light is greater than a threshold;
        when it is determined that the measurement value of ambient light is less than or equal to the threshold, control the device to operate in a standby mode; and
        when it is determined that the measurement value of ambient light is greater than the threshold:
            detect, by a motion sensor of the device, movement in a predefined area;
            generate, by the motion sensor, a motion-detection signal when the movement is detected;
            control the device to operate in a quick-start mode when the motion-detection signal is received, wherein when the device operates in the quick-start mode and keeps receiving the motion-detection signal the processor:
            starts a timer;
            switches the device from the quick-start mode to the standby mode when the timer has expired and the device is not turned on; and
            determines, after the device has switched to the standby mode, whether the device receives the motion detection signal, and switches the device back to the quick-start mode when it is determined that the motion detection signal is received; and
        control the device to operate in the standby mode when the motion detection signal is not received.

4. The power-saving device as claimed in claim 3, wherein when the device operates in the quick-start mode, the processor is further configured to execute the program code to:
    switch the device from the quick-start mode to the standby mode when the measurement value of ambient light is less than or equal to the threshold.

* * * * *